United States Patent
Qu

(10) Patent No.: US 8,277,183 B2
(45) Date of Patent: Oct. 2, 2012

(54) SYSTEMS AND METHODS FOR MONITORING WIND TURBINE OPERATION

(75) Inventor: Xiaojuan Qu, Beijing (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/570,101

(22) Filed: Sep. 30, 2009

(65) Prior Publication Data

US 2010/0135788 A1    Jun. 3, 2010

(51) Int. Cl.
*F03D 7/00* (2006.01)
*F03D 7/04* (2006.01)

(52) U.S. Cl. .................. 416/1; 416/35; 416/61

(58) Field of Classification Search .............. 415/1, 118; 416/17, 30, 35, 36, 44, 61, 1; 290/44, 55
See application file for complete search history.

(56) References Cited

U.S. PATENT DOCUMENTS

| | | | |
|---|---|---|---|
| 5,278,773 A | | 1/1994 | Cousineau |
| 6,005,638 A * | | 12/1999 | Blair et al. .................... 348/607 |
| 6,785,637 B1 | | 8/2004 | Wobben |
| 6,864,594 B2 * | | 3/2005 | Seki ............................... 290/44 |
| 6,966,754 B2 | | 11/2005 | Wobben |
| 7,013,203 B2 | | 3/2006 | Moore et al. |
| 7,099,800 B2 | | 8/2006 | Henriksen et al. |
| 7,114,174 B1 * | | 9/2006 | Brooks et al. ................. 725/105 |
| 7,199,482 B2 | | 4/2007 | Hopewell |
| 7,698,024 B2 * | | 4/2010 | Gizara et al. ..................... 701/2 |
| 2002/0029097 A1 * | | 3/2002 | Pionzio et al. ................. 700/286 |
| 2003/0102675 A1 * | | 6/2003 | Noethlichs ....................... 290/44 |
| 2009/0022589 A1 * | | 1/2009 | Sorensen ......................... 416/41 |
| 2009/0153656 A1 * | | 6/2009 | Sharonova ..................... 348/125 |

OTHER PUBLICATIONS

Gregor Giebel, et al., Clever Farm—A SuperSCADA System for Wind Farms, Riso-R Report, Aug. 2004, pp. 1-57, Riso-R-1444(EN), Riso National Laboratory, Roskilde, Denmark.

* cited by examiner

*Primary Examiner* — Edward Look
*Assistant Examiner* — Sean J Younger
(74) *Attorney, Agent, or Firm* — James McGinness, Esq.; Armstrong Teasdale LLP

(57) ABSTRACT

A method is provided for monitoring a wind turbine using a combined supervisory command and data acquisition (SCADA) and video monitoring system. The method includes receiving video data from at least one video camera, wherein the video data is related to operating conditions of the wind turbine. The method also includes storing the video data in a memory, and receiving a command from a remote monitoring server relating to at least a portion of the video data, wherein the portion of the video data is associated with at least one SCADA data point. The method also includes retrieving the portion of the video data from the memory, and transmitting the portion of the video data to the remote monitoring server for presentation to a user.

14 Claims, 9 Drawing Sheets

SYSTEMS AND METHODS FOR MONITORING WIND TURBINE OPERATION

BACKGROUND

The embodiments described herein relate generally to wind turbine monitoring systems and, more particularly, to combined supervisory command and data acquisition (SCADA) and video monitoring systems.

At least some known monitoring systems for use with wind farms enable acquisition of various data via a standalone SCADA system. Such known systems enable collection of data including turbine operating status and performance data. Moreover, root causes of faults within the wind turbine may be analyzed for use in creating maintenance plans. However, such known systems require a high level of prior knowledge in order to determine the root causes of faults, which limits the troubleshooting time cycle and requires additional travel expenses for service personnel to visit the wind farm.

BRIEF DESCRIPTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for monitoring a wind turbine using a combined supervisory command and data acquisition (SCADA) and video monitoring system. The method includes receiving video data from at least one video camera, wherein the video data relates to operating conditions of the wind turbine. The method also includes storing the video data in a memory, and receiving a command from a remote monitoring server relating to at least a portion of the video data, wherein the portion of the video data is associated with at least one SCADA data point. The method also includes retrieving the portion of the video data from the memory, and transmitting the portion of the video data to the remote monitoring server for presentation to a user.

In another aspect, a system is provided for use in monitoring a wind farm having a plurality of wind turbines. The system includes at least one video camera that is configured to capture video data related to operating conditions of an associated wind turbine. The system also includes at least one supervisory command and data acquisition (SCADA) element that is configured to capture numerical data related to the operating conditions of an associated wind turbine, and a user interface. At least one server is communicatively coupled to the video camera, the SCADA element, and the user interface. The server is configured to receive a specific portion of the video data based on a corresponding portion of the numerical data, and present the specific portion of the video data to a user via the user interface.

In yet another aspect, a computer is provided. The computer is coupled to a remote monitoring server in communication with a supervisory command and data acquisition (SCADA) server for use in monitoring a wind farm having a plurality of wind turbines. The computer is further in communication with at least one video camera configured to capture video data related to operating conditions of an associated wind turbine. The computer is programmed to receive the video data from the video camera, store the video data in a memory, receive a command from the remote monitoring server related to at least a portion of the video data associated with at least one SCADA data point, retrieve the portion of the video data from the memory, and transmit the portion of the video data to the remote monitoring system for presentation to a user.

BRIEF DESCRIPTION OF THE DRAWINGS

The embodiments described herein may be better understood by referring to the following description in conjunction with the accompanying drawings.

DETAILED DESCRIPTION

Figure 1:
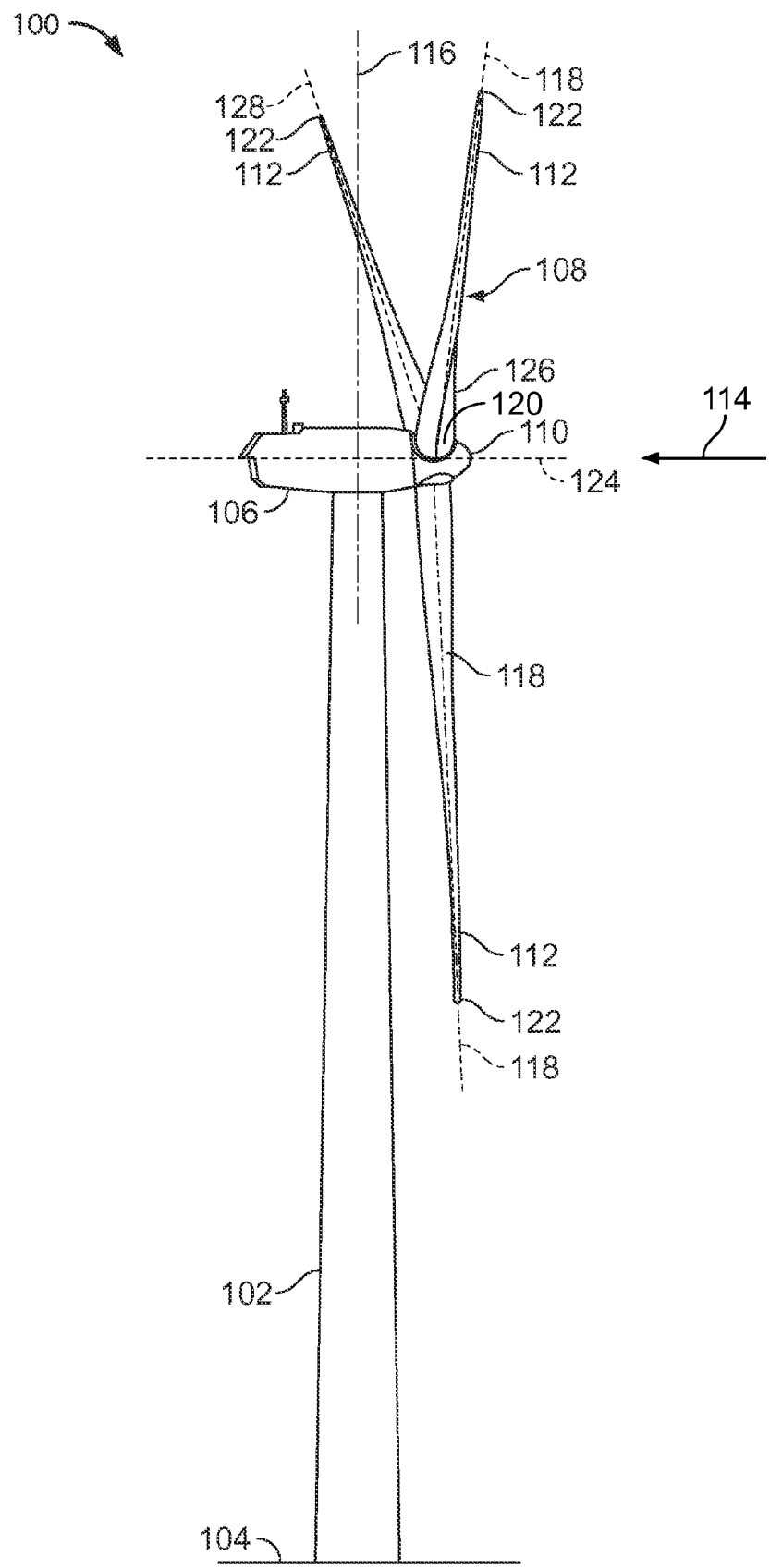
FIG. 1 is a schematic view of an exemplary wind turbine.

Exemplary embodiments of apparatus, systems, methods, and computer-readable storage media for use in monitoring wind turbine operations are described below in detail. The apparatus, systems, methods, and storage media are not limited to the specific embodiments described herein but, rather, steps of the methods and/or components of the system and/or apparatus may be utilized independently and separately from other steps and/or components described herein. Further, the described steps and/or components may also be defined in, or used in combination with, other systems, methods, and/or apparatus, and are not limited to practice with only the systems, methods, and storage media as described herein.

A computer, computer system, or server, such as those described herein, includes at least one processor or processing unit and a system memory. The computer, computer system, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary monitoring system environment, embodiments of the invention are operational with numerous other general purpose or special purpose monitoring system environments or configurations. The monitoring system environment is not intended to suggest any limitation as to the scope of use or functionality of any aspect of the invention. Moreover, the monitoring system environment should not be interpreted as having any dependency or requirement relating to any one or combination of components illustrated in the exemplary operating environment. Examples of well known monitoring systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

Technical effects of apparatus, methods, systems, and computer-readable media described herein include at least one of: (a) capturing video data and numerical data related to operating conditions of wind turbines and other elements within a wind farm; (b) identifying the video data and numerical data according to a timestamp and an identifier associated with the particular video camera or supervisory command and data acquisition (SCADA) element having captured the data; (c) storing the video data in a memory of a video master server; (d) transmitting the numerical data to a remote monitoring server; (e) storing the numerical data, including a plurality of SCADA data points relating to normal operations, alarms, and/or events, in a database; (f) analyzing the numerical data; (g) receiving a command at the video master server from the remote monitoring server, wherein the command is one of automatically issued in response to an alarm or event, manually input by a user in response to an alarm or an event, and manually input by a user; (h) determining a portion of the video data stored at the video master server according to an identifier related to a SCADA data point; (i) retrieving the identified portion of the video data from the memory; (j) transmitting the identified portion of the video data to the remote monitoring server; and, (k) presenting the identified portion of the video data and the numerical data associated with the SCADA data point to a user via a user interface.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 by either anchor bolts or via a foundation mounting piece for example (neither shown). A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any number of rotor blades 112 that enable wind turbine 100 to function as described herein. Tower 102 is any suitable height or construction that enables wind turbine 100 to function as described herein.

Rotor blades 112 are spaced about rotor hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control the perspective of rotor blades 112 with respect to the direction of wind 114. Rotor blades 112 are mated to hub 110 by coupling a blade root portion 118 to hub 110 at a plurality of load transfer regions 120. Load transfer regions 120 each have a hub load transfer region and a blade load transfer region (both not shown in FIG. 1). Loads induced to rotor blades 112 are transferred to hub 110 via load transfer regions 120. Each rotor blade 112 also includes a blade tip portion 122.

In the exemplary embodiment, rotor blades 112 have a length of between approximately 50 meters (m) (164 feet (ft)) and approximately 120 m (394 ft). Alternatively, rotor blades 112 may have any length less than approximately 50 m or greater than approximately 120 m that enables wind turbine generator to function as described herein. As wind 114 contacts each rotor blade 112, blade lift forces are induced to each rotor blade 112 and rotation of rotor 108 about an axis of rotation 124 is induced as blade tip portions 122 are accelerated.

A pitch angle (not shown) of rotor blades 112, i.e., an angle that determines a perspective of each rotor blade 112 with respect to a direction of wind 114, may be changed by a pitch assembly (not shown in FIG. 1). Specifically, increasing a pitch angle of rotor blade 112 decreases an amount of blade surface area 126 exposed to wind 114 and, conversely, decreasing a pitch angle of rotor blade 112 increases an amount of blade surface area 126 exposed to wind 114. The pitch angles of rotor blades 112 are adjusted about a pitch axis 128 for each rotor blade 112. In the exemplary embodiment, the pitch angles of rotor blades 112 are controlled individually. Alternatively, the pitch angles of rotor blades 112 are controlled as a group.

Figure 2:
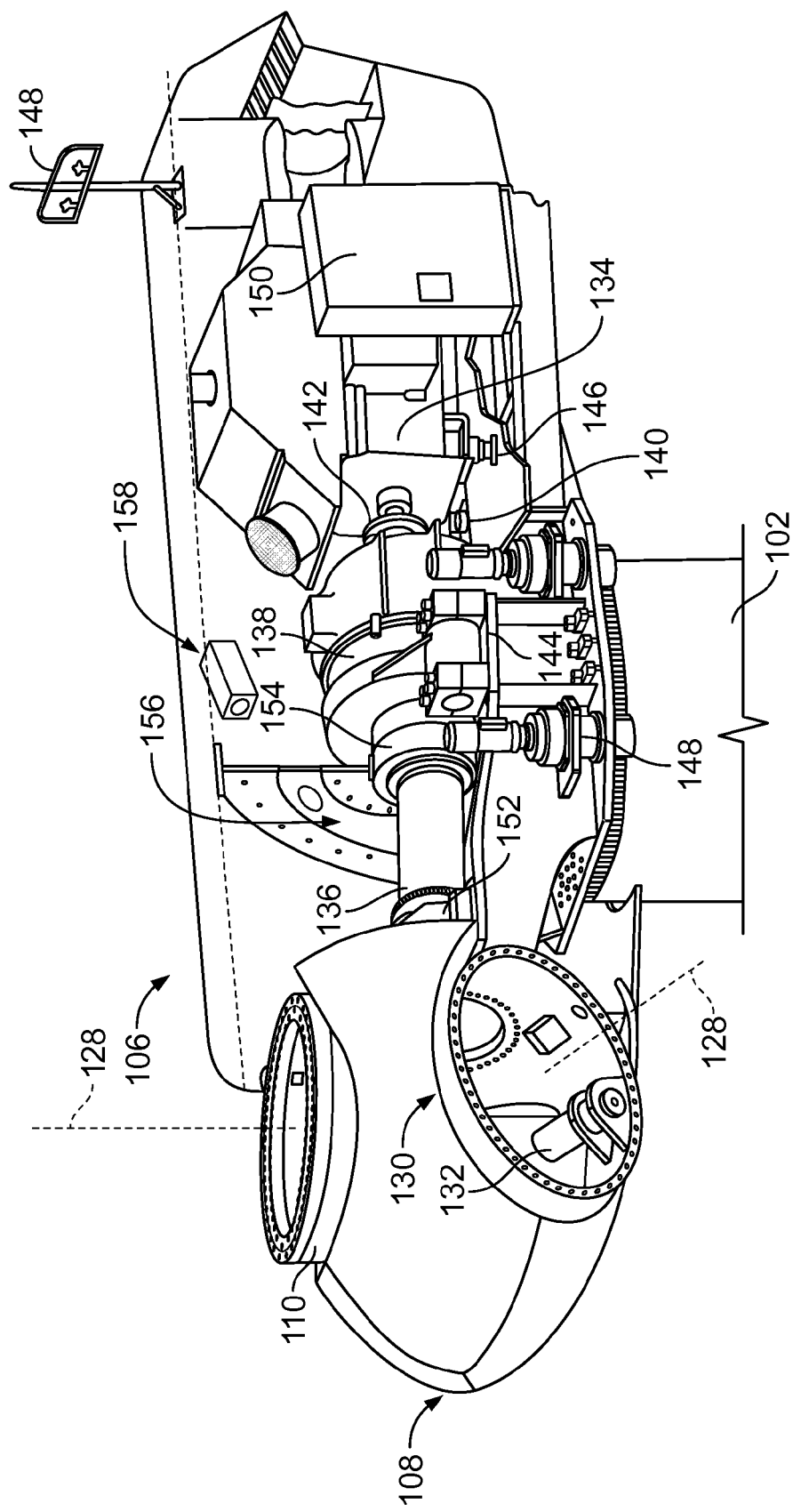
FIG. 2 is a schematic partial sectional view of a nacelle that may be used with the wind turbine shown in FIG. 1.

FIG. 2 is a schematic partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1) and modulates the pitch of associated rotor blade 112 along pitch axis 128. Only one of three pitch assemblies 130 is illustrated in FIG. 2. In the exemplary embodiment, each pitch assembly 130 includes at least one pitch drive motor 132.

Nacelle 106 also includes rotor 108 that is rotatably coupled to an electric generator 134 positioned within nacelle 106 via rotor shaft 136 (sometimes referred to as either a main shaft or a low speed shaft), a gearbox 138, a high speed shaft 140, and a coupling 142. Rotation of shaft 136 rotatably drives gearbox 138 that subsequently drives high speed shaft 140. High speed shaft 140 rotatably drives generator 134 via coupling 142 and rotation of high speed shaft 140 facilitates production of electrical power by generator 134. Gearbox 138 and generator 134 are supported by supports 144 and 146, respectively. In the exemplary embodiment, gearbox 138 utilizes a dual-path geometry to drive high speed shaft 140. Alternatively, rotor shaft 136 is coupled directly to generator 134 via coupling 142.

Nacelle 106 also includes a yaw drive mechanism 148 that may be used to rotate nacelle 106 and rotor 108 on yaw axis 116 (shown in FIG. 1) to control the perspective of rotor blades 112 with respect to the direction of wind 114. Nacelle 106 also includes at least one meteorological mast 148 that includes a wind vane and anemometer (neither shown in FIG. 2). Mast 148 provides information to a turbine control system 150 that may include wind direction and/or wind speed. Pitch assembly 130 is coupled to control system 150 for control thereby. In the exemplary embodiment, nacelle 106 also includes main, or forward and aft, support bearings 152 and 154, respectively. Support bearings 152 and 154 facilitate radial support and alignment of rotor shaft 136. Forward support bearing 152 is coupled to rotor shaft 136 near hub 110. Aft support bearing 154 is positioned on rotor shaft 136 near gearbox 138 and/or generator 134. Alternatively, nacelle 106 includes any number of support bearings that enable wind turbine 100 to function as disclosed herein. Rotor shaft 136, generator 134, gearbox 138, high speed shaft 140, coupling 142, and any associated fastening, support, and/or securing device including, but not limited to, supports 144 and 146, and support bearings 152 and 154, are sometimes referred to as a drive train 156.

Moreover, in the exemplary embodiment, one or more video cameras 158 are positioned on an exterior surface of or within nacelle 106 to monitor wind turbine operating conditions such as, but not limited to, structural movement of rotor blades 112, tower 102 (shown in FIG. 1), and support bearings 152 and 154. The operating conditions may also relate to vibration of a generator and/or a mainframe (neither shown), mechanical abrasion, falling poles, damage to rotor blades 112 due to hail, lightning, or other environmental conditions. More specifically, in the exemplary embodiment, two video cameras 158 are positioned symmetrically opposite each other on opposing sides of drive train 156 (only one video camera 158 shown in FIG. 2). However, alternative embodiments may include only a single video camera 158 or more than two video cameras 158. In the exemplary embodiment, video cameras 158 are rotatably coupled to a ceiling (not shown) of nacelle 106 to facilitate obtaining video data related to wind turbine components other than drive train 156. Alternatively, video cameras 158 may be coupled to one or more side walls (not shown) of nacelle 106. In the exemplary embodiment, video cameras 158 continuously record video data. In an alternative embodiment, video cameras 158 record periodic still images. In the exemplary embodiment, video cameras 158 are communicatively coupled to control system 150 to facilitate transmitting the video data to a remote monitoring system (not shown in FIG. 2). In some embodiments, one or more video cameras 158 may be positioned external to nacelle 106. For example, a single video camera 158 may be positioned along a top external surface (not shown) of nacelle 106. As another example, one or more video cameras 158 may be positioned at ground level to capture video data related to rotor blades 112 and/or tower 102.

Figure 3:
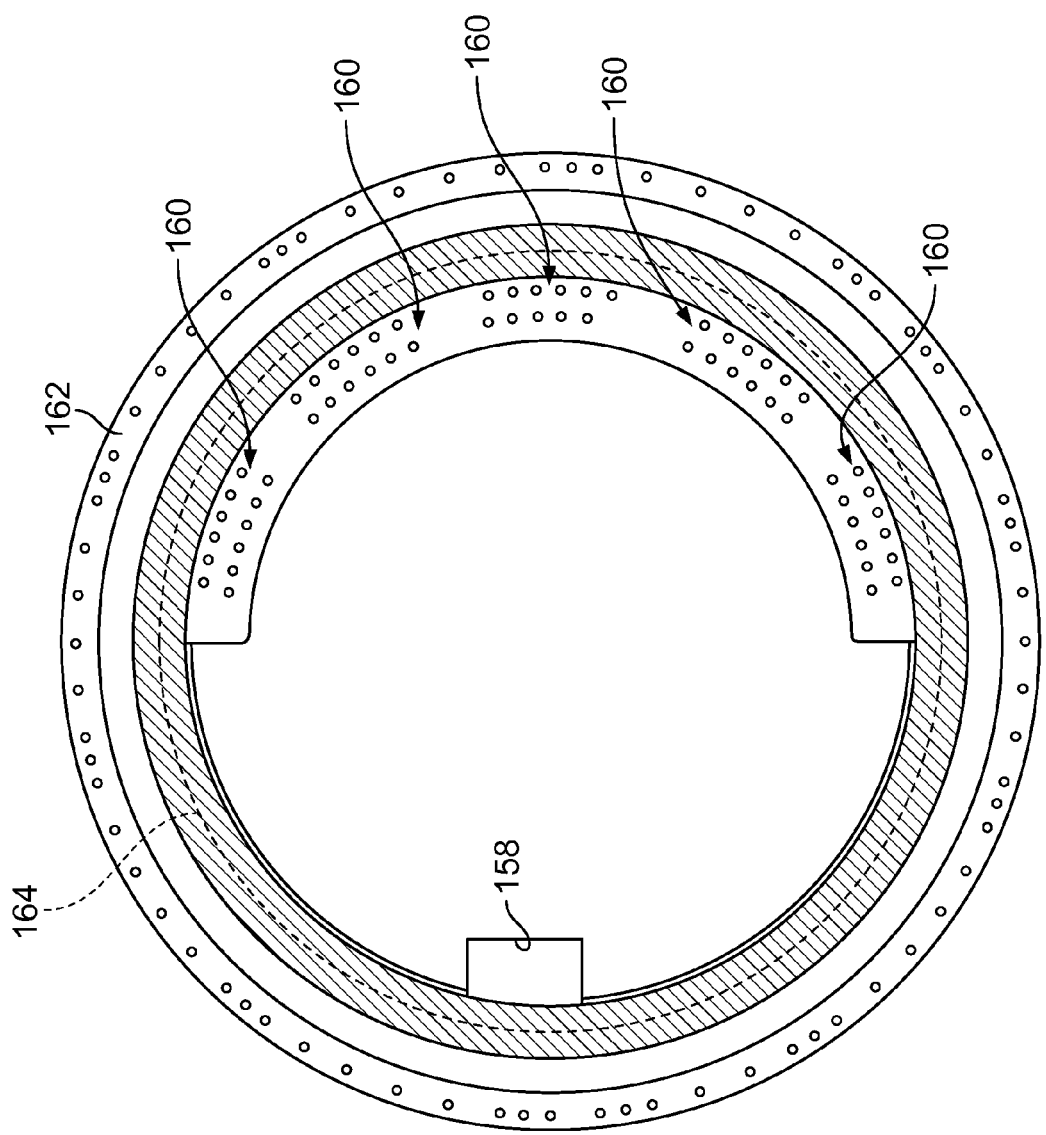
FIG. 3 is a schematic view of a plurality of yaw brake calipers that may be used with the wind turbine shown in FIG. 1.

In some embodiments and, as shown in FIG. 3, wind turbine 100 (shown in FIG. 1) also includes one or more yaw brake calipers 160 that are coupled to a brake disk 162, which is in turn fixedly coupled to nacelle 106 (shown in FIG. 1). More specifically, calipers 160 are coupled, such as movably coupled, to a braking area 164. In such embodiments, one or more video cameras 158 are coupled, such as movably coupled, to braking area 164 opposite calipers 160 to facilitate capturing video data relating to operation of calipers 160. Video cameras 158 are coupled to control system 150 to facilitate transmitting the video data to a remote monitoring system (not shown in FIG. 3).

Figure 4:
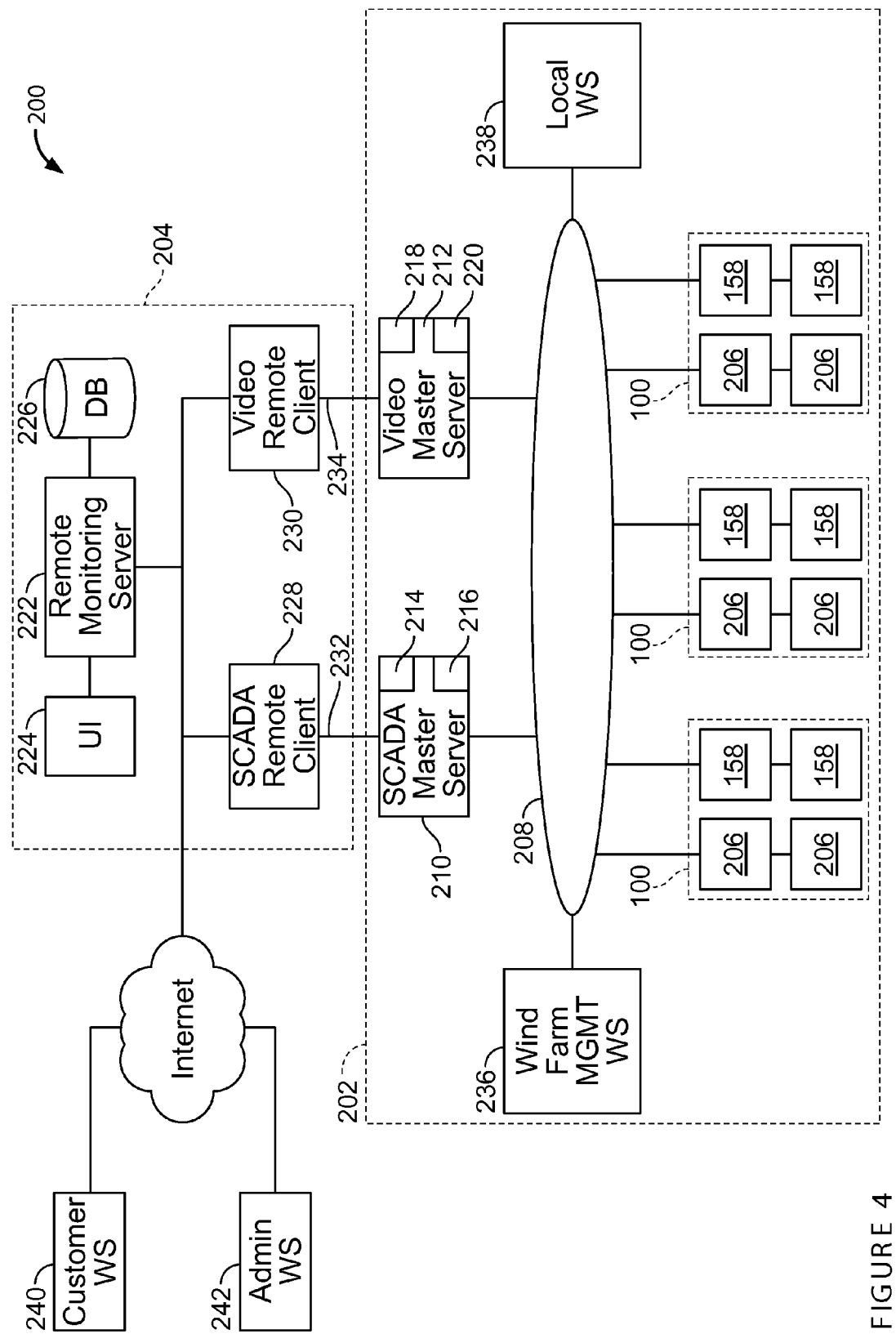
FIG. 4 is a schematic block diagram of an exemplary system for use in monitoring a wind farm having a plurality of wind turbines, such as the wind turbine shown in FIG. 1.

FIG. 4 is a block schematic diagram of an exemplary system 200 for use in monitoring a wind farm 202 having a plurality of wind turbines 100. System 200 may generally be divided into two portions, including wind farm 202 and a remote control center 204, which are located at different geographical locations. In the exemplary embodiment, wind farm 202 includes a plurality of SCADA elements 206 and a plurality of video cameras 158. SCADA elements 206 capture numerical data related to operating conditions of a respective wind turbine 100 such as, for example, alarms and/or events that occur during operation. SCADA elements 206 also apply a timestamp to the numerical data. As described above, video cameras 158 capture wind turbine operating conditions such as, but not limited to, structural movement of rotor blades 112 (shown in FIG. 1), tower 102 (shown in FIG. 1), and support bearings 152 and 154 (each shown in FIG. 2). The operating conditions may also relate to vibration of a generator and/or a mainframe (neither shown), mechanical abrasion, falling poles, damage to rotor blades 112 due to hail, lightning, or other environmental conditions. Video cameras 158 also apply a timestamp to the video data. Each SCADA element 206 and video camera 158 is coupled to wind farm network 208. More specifically, each SCADA element 206 and video camera 158 is coupled to control system 150 (shown in FIG. 2), which is coupled to wind farm network 208.

Wind farm 202 also includes a SCADA master server 210 and a video master server 212 each coupled to a wind farm network 208. Moreover, SCADA master server 210 receives via wind farm network 208 the numerical data obtained by SCADA elements 206, and stores the numerical data in a memory 214 and/or a database 216. SCADA master server 210 also applies an identifier to the numerical data. For example, the identifier may be a combination of the timestamp applied to the numerical data by a particular SCADA element 206 and a unique identifier associated with the particular SCADA element 206 that indicates the location of the particular SCADA element 206 with respect to a wind turbine 100. In some embodiments, SCADA master server 210 temporarily stores the numerical data and periodically deletes numerical data obtained prior to a particular date. Similarly, video master server 212 receives through wind farm network 208 the video data obtained by video cameras 158, and stores the video data in a memory 218 and/or a database 220. In addition, video master server 212 compresses the video data prior to storing the video data in the memory or database. Video master server 212 also applies an identifier to the video data. For example, the identifier may be a combination of the timestamp applied to the video data by a particular video camera 158 and a unique identifier associated with the particular video camera 158 that indicates the location of the particular video camera 158 with respect to a wind turbine 100. In some embodiments, video master server 212 temporarily stores the video data and periodically deletes video data obtained prior to a particular date.

Remote control center 204 includes a remote monitoring server 222 that is coupled to a user interface 224 and a database 226. User interface 224 may be a display device, a thin client, or any other suitable interface for receiving user commands and/or displaying data. Remote control center 204 also includes a supervisory command and data acquisition (SCADA) remote client 228 and a video remote client 230. In the exemplary embodiment, SCADA remote client 228 and video remote client 230 are each software-based elements. In one embodiment, each client 228 and 230 is hosted on a single computer or server (not shown). In an alternative embodiment, SCADA remote client 228 is hosted on a first computer (not shown) and video remote client 230 is hosted on a second computer (not shown). Each master server 210 and 212 is also coupled to a respective remote client 228 and 230 via a respective network. Specifically, SCADA master server 210 is coupled to SCADA remote client 228 via a first network 232, and video master server 212 is coupled to video remote client 230 via a second network 234. In the exemplary embodiment, each network 232 and 234 is a virtual local area network (VLAN). In an alternative embodiment, each master server 210 and 212 communicates with a respective remote client 228 and 230 via a single network. In the exemplary embodiment, SCADA master server 210 transmits the numerical data to SCADA remote client 228, which transmits the numerical data to remote monitoring server 222 for storage in database 226.

In the exemplary embodiment, system 200 also includes a plurality of workstations. For example, a wind farm management workstation 236 and a local workstation 238 are coupled to wind farm network 208. Wind farm management workstation 236 enables a user to configure operating rules and/or conditions of each wind turbine 100, SCADA elements 206, and/or video cameras 158. Moreover, wind farm management workstation 236 enables a user, such as service personnel, to conduct troubleshooting when an alarm or other event occurs. Local workstation 238 similarly enables a user, such as service personnel, to conduct troubleshooting when an alarm or other event occurs. However, local workstation 238 is a mobile device, such as a personal digital assistant (PDA), a laptop computer, or any other suitable mobile device that enables a user to conduct troubleshooting or to modify configuration settings outside of a wind farm management building (not shown). Moreover, in the exemplary embodiment, a customer workstation 240 and an administrator workstation 242 are coupled to remote control center 204 via, for example, the Internet. Customer workstation 240 and/or administrator workstation 242 enable a user to display numerical data obtained by SCADA elements 206 and/or video data obtained by video cameras 158.

Figure 5:
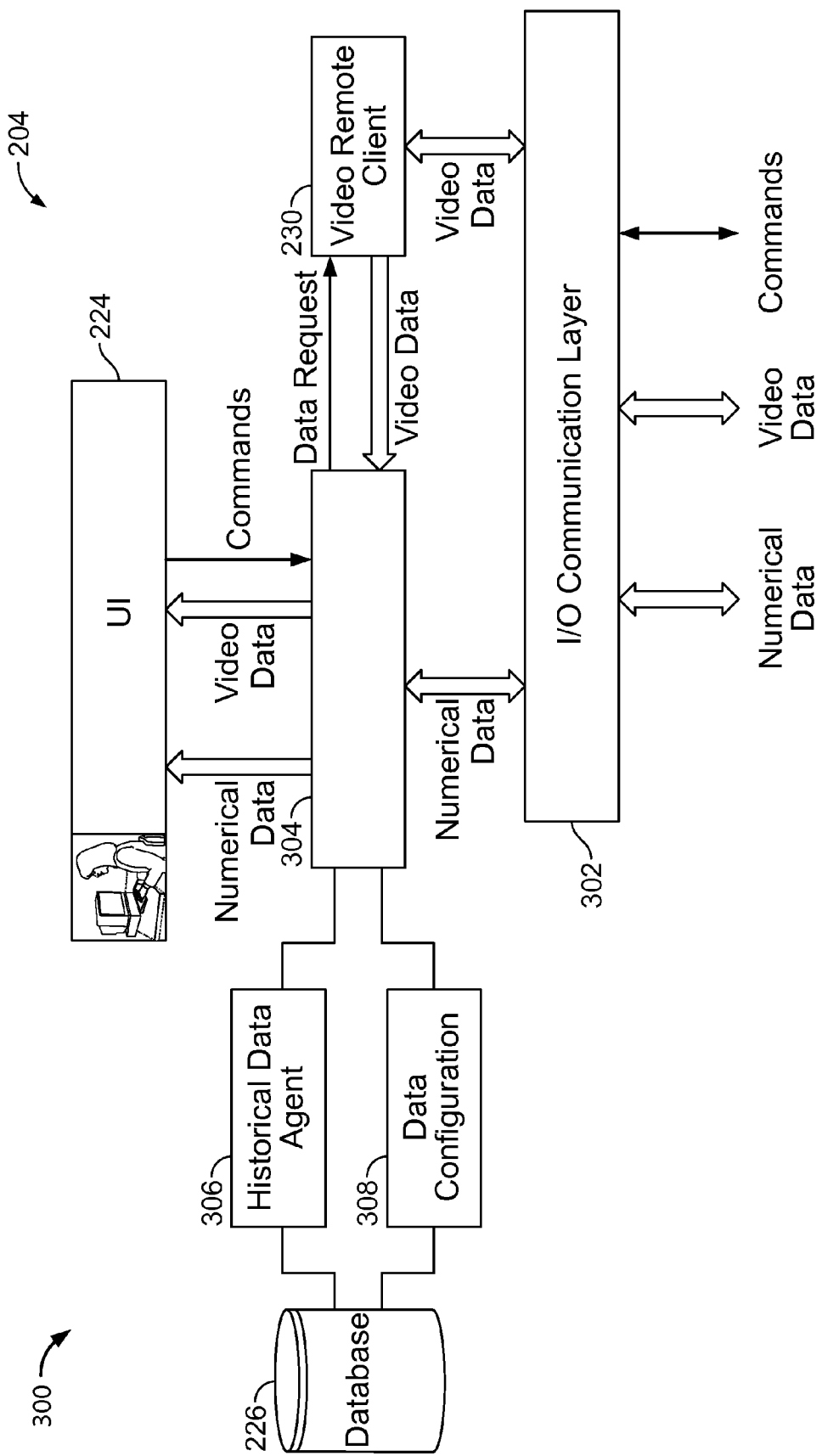
FIG. 5 is a block diagram that illustrates an exemplary communication architecture of a remote control center that may be used with the system shown in FIG. 4.

FIG. 5 is a block diagram that illustrates an exemplary communication architecture 300 within remote control center 204. In the exemplary embodiment, an input/output (I/O) communication layer 302 receives numerical data, video data, and commands from, for example, SCADA master server 210 and video master server 212 (both shown in FIG. 4). I/O communication layer 302 provides the numerical data, video data, and/or commands to a SCADA data exchange layer 304 and video remote client 230. In addition, video remote client 230 provides video data to SCADA data exchange layer 304 in response to a data request issued by SCADA data exchange layer 304 to video remote client 230. In the exemplary embodiment, and as noted above, SCADA data exchange layer 304 and video remote client 230 are software-based implementations that are hosted by a single computer or server (not shown). SCADA data exchange layer 304 then provides the numerical data and/or video data to user interface 224 (shown in FIG. 4). More specifically, SCADA data exchange layer 304 provides the numerical data and/or video data to remote monitoring server 222 (shown in FIG. 4), which, in turn, provides the numerical data and/or video data to user interface 224.

Moreover, user interface 224 receives commands via user input and transmits the user commands to SCADA data exchange layer 304. More specifically, user interface 224 transmits the user commands to remote monitoring server 222, which transmits the user commands to SCADA data exchange layer 304. If the user commands are video-related, SCADA data exchange layer 304 transmits the user commands to video remote client 230. Video remote client 230 then transmits the user commands to video master server 212, as described in more detail below. Furthermore, in the exemplary embodiment, an historical data agent 306 and a data configuration tool 308 each interact with SCADA data exchange layer 304 and database 226 (shown in FIG. 4). It should be noted that historical data agent 306 and data configuration tool 308 may be hosted by a single computer or server (not shown) or by multiple computers or servers. Moreover, historical data agent 306 and data configuration tool 308 may be hosted by the same computer or server as SCADA data exchange layer 304 and/or video remote client 230. Historical data agent 306 analyzes the numerical data to determine whether an alarm or event has occurred at wind farm 202 (shown in FIG. 4). Data configuration tool 308 interfaces with, for example, customer workstation 240 and/or administrator workstation 242 (both shown in FIG. 4) to setup, for example, alarm and/or event limits for operating conditions.

Figure 6:
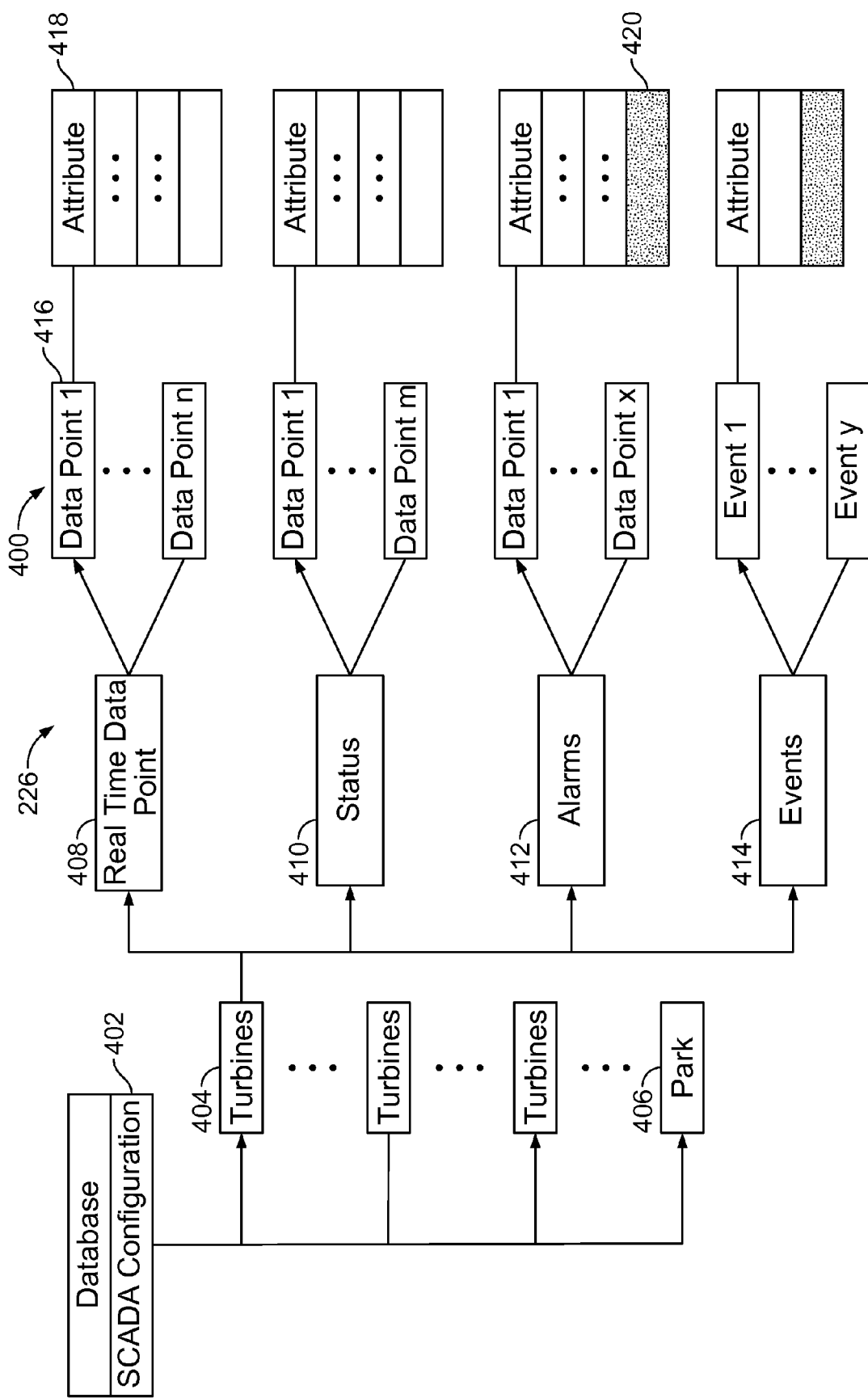
FIG. 6 is an exemplary architecture of storage tables within a database that may be used with the system shown in FIG. 4.

FIG. 6 is an exemplary architecture 400 of storage tables within database 226. As shown in FIG. 6, database 226 includes one or more SCADA configuration tables 402, including a turbine table 404 associated with each wind turbine 100 (shown in FIG. 1) within a wind farm 202 (shown in FIG. 4) and at least one park table 406. In the exemplary embodiment, each turbine table 404 stores data related to an associated wind turbine 100, such as an identifier, a location, an operating status, and the like. Park table 406 stores data related to wind farm elements other than wind turbines, such as power lines and the like. Each turbine table 404 and park table 406 is linked to a real-time data point table 408, a status table 410, an alarms table 412, and an events table 414. Each of data point table 408, status table 410, alarms table 412, and events table 414 stores a plurality of data points 416 and attributes 418 associated with each data point 416. In addition, each data point 416 within alarm table 412 and event table 414 includes a video attribute 420 that indicates whether video cameras 158 (shown in FIG. 4) acquired video data at a particular time associated with each data point 416. More specifically, video attribute 420 indicates that video master server 212 (shown in FIG. 4) has stored video data at a particular time associated with each data point 416.

Figure 7:
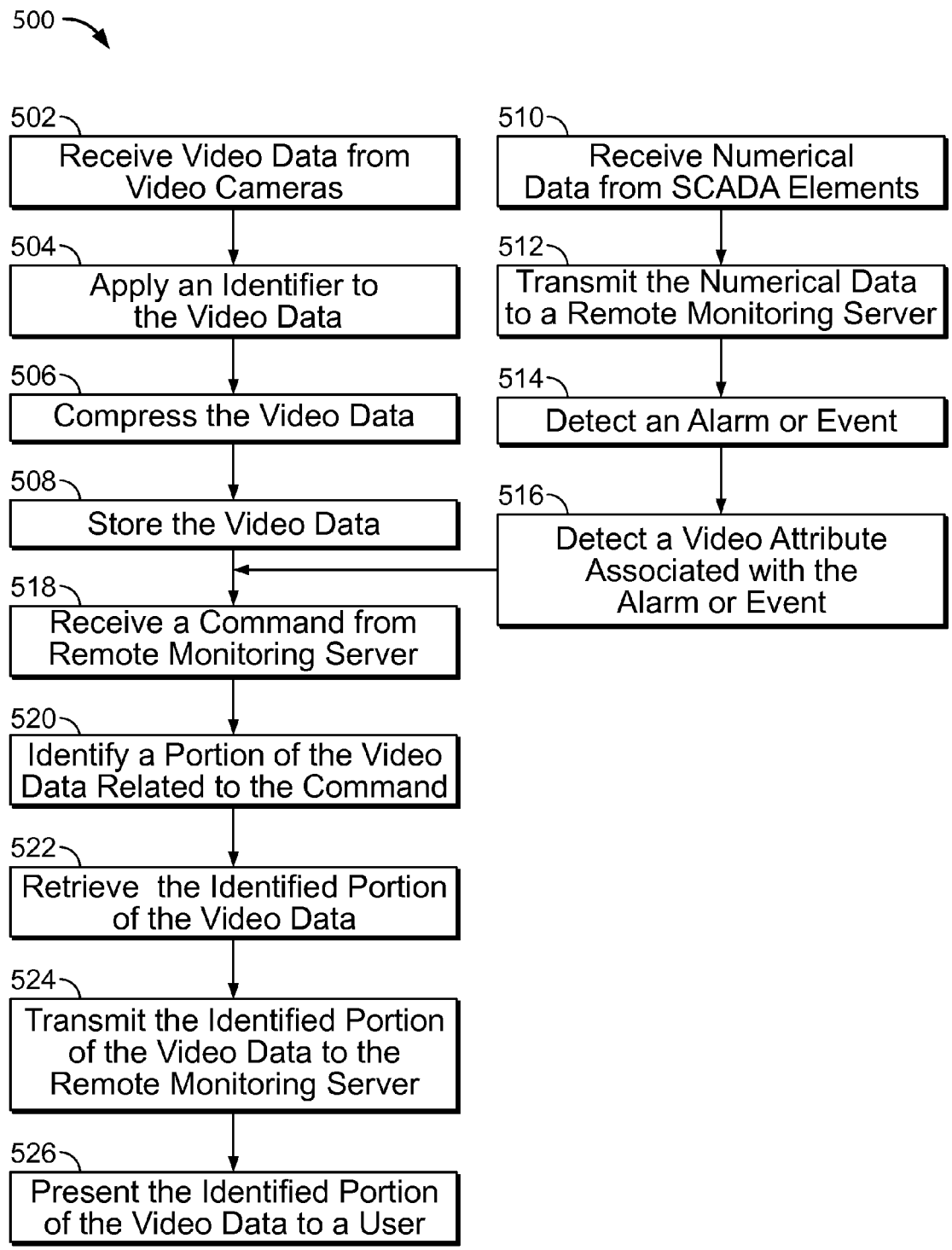
FIG. 7 is a high-level flowchart that illustrates an exemplary method for monitoring the wind turbine shown in FIG. 1 using the system shown in FIG. 4.

FIG. 7 is a high-level flowchart 500 that illustrates an exemplary method for monitoring a wind turbine, such as wind turbine 100 (shown in FIG. 1), using a combined SCADA and video monitoring system, such as system 200 (shown in FIG. 4).

In the exemplary embodiment, video master server 212 receives 502 video data from video cameras 158 via wind farm network 208 (each shown in FIG. 4). As described above, video cameras 158 capture video data related to wind turbine operating conditions, and transmit the video data to video master server 212. The operating conditions include, without limitation, structural movement of rotor blades 112 (shown in FIG. 1), tower 102 (shown in FIG. 1), and support bearings 152 and 154 (each shown in FIG. 2). The operating conditions may also relate to vibration of a generator and/or a mainframe (neither shown), mechanical abrasion, falling poles, damage to rotor blades 112 due to hail, lightning, or other environmental conditions. Video master server 212 applies 504 an identifier to the video data based on, for example, a timestamp applied to the video data by an acquiring video camera 158 and an identifier of the acquiring video camera 158. Video master server 212 also compresses 506 the video data and stores 508 the video data in memory 218 and/or database 220 (each shown in FIG. 4).

Moreover, in the exemplary embodiment, SCADA master server 210 receives 510 numerical data from SCADA elements 206 via wind farm network 208 (each shown in FIG. 4). As described above, SCADA elements 206 capture numerical data related to wind turbine operating conditions, and transmit the numerical data to SCADA master server 210. SCADA master server 210 then transmits 512 the numerical data to remote monitoring server 222 (shown in FIG. 4).

Remote monitoring server 222 detects 514 an alarm or an event in the numerical data and, in response to the alarm or event, detects 516 whether a video attribute is associated with the alarm or event. Video master server 212 then receives 518 a command from remote monitoring server 222. The command relates to a portion of the video data that is associated with a SCADA data point within the numerical data. In one embodiment, remote monitoring server 222 automatically transmits the command in response to a detection of an alarm or event that is detected upon an analysis of the numerical data acquired by SCADA elements 206. In an alternative embodiment, a user inputs the command via user interface 224 (shown in FIG. 4) in response to a detection of an alarm or event within the numerical data, and remote monitoring server 222 transmits the command to video master server 212. In another alternative embodiment, a user inputs the command via user interface 224 and remote monitoring server 222 transmits the command to video master server 212.

In the exemplary embodiment, after receiving the command, video master server 212 identifies 520 a portion of the video data associated with the command. Video master server 212 retrieves 522 the identified portion of the video data from memory 218 or database 220, and transmits 524 the identified portion of the video data to remote monitoring server 222. Remote monitoring server 222 then presents 526 the identified portion of the video data to the user via user interface 224. In one embodiment, video master server 212 applies an additional compression algorithm to the identified portion of the video data before transmitting the identified portion of the video data to remote monitoring server 222.

Figure 8A:
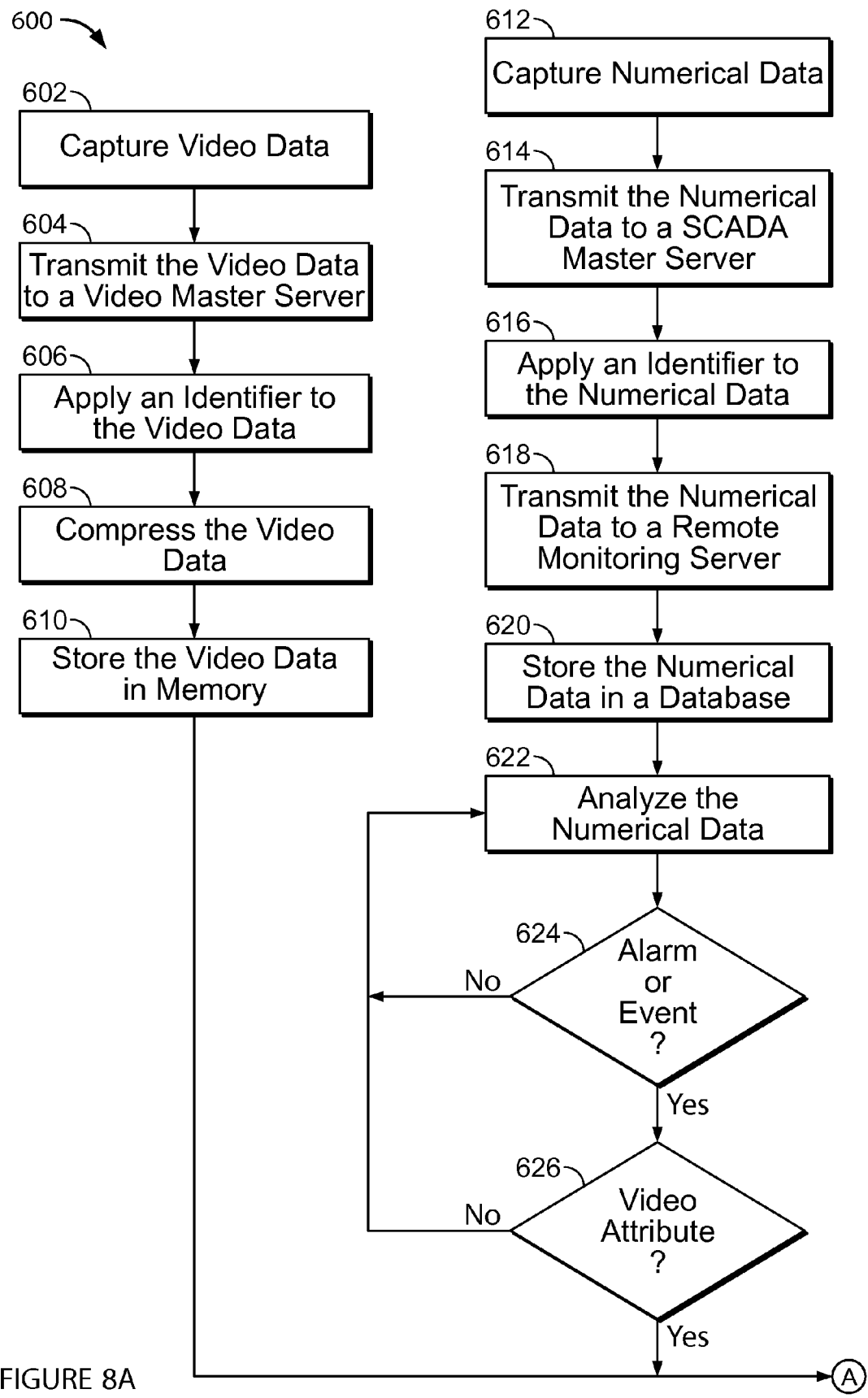
FIGS. 8A and 8B are a detailed flowchart that further illustrates the method shown in FIG. 7.
Figure 8B:
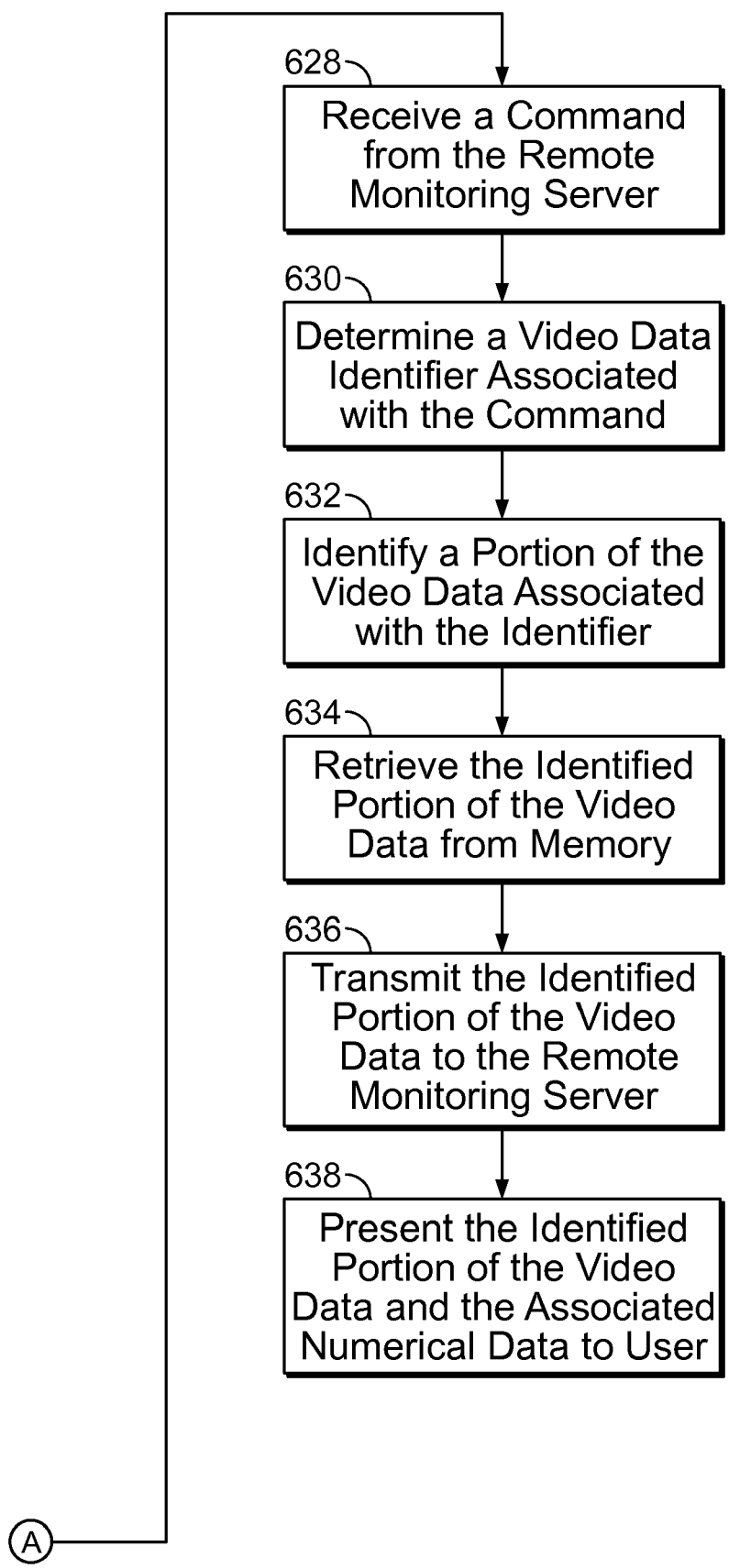

FIGS. 8A and 8B are a detailed flowchart 600 that further illustrates the method shown in FIG. 7. In the exemplary embodiment, video cameras 158 capture 602 video data related to wind turbine operating conditions, and transmit 604 the video data to video master server 212 via wind farm network 208 (each shown in FIG. 4). Video master server 212 applies 606 an identifier to the video data based on, for example, a timestamp applied to the video data by an acquiring video camera 158 and an identifier of the acquiring video camera 158. Video master server 212 also compresses 608 the video data and stores 610 the video data in memory 218 and/or database 220 (each shown in FIG. 4).

Moreover, in the exemplary embodiment, SCADA elements 206 capture 612 numerical data related to wind turbine operating conditions, and transmit 614 the numerical data to SCADA master server 210 via wind farm network 208 (each shown in FIG. 4). SCADA master server 210 then applies 616 an identifier to the numerical data and transmits 618 the numerical data to remote monitoring server 222 (shown in FIG. 4). More specifically, SCADA master server 210 transmits the numerical data to SCADA data exchange layer 304 via I/O communication layer 302 (both shown in FIG. 5). SCADA data exchange layer 304 provides the numerical data to database 226 (shown in FIG. 4), which stores the numerical data based on architecture 400 (shown in FIG. 6). Specifically, database 226 stores 620 the numerical data into an appropriate database table based on the SCADA data points 416 in the numerical data.

In one embodiment, after the numerical data has been stored, historical data agent 306 (shown in FIG. 5) analyzes 622 the numerical data to determine 624 whether an alarm or event has occurred. In an alternative embodiment, SCADA data exchange layer 304 and/or database 226 determines whether each SCADA data point 416 within the numerical data represents an alarm, an event, or normal numerical data. If the numerical data represents normal numerical data, historical data agent 306 continues to analyze 622 the numerical data. If a particular SCADA data point 416 is determined to represent an alarm or an event, database 226 determines 626 whether the particular SCADA data point 416 includes video attribute 420 (shown in FIG. 5). If the particular SCADA data point 416 does not include video attribute 420, historical data agent 306 continues to analyze 622 the numerical data.

In the exemplary embodiment, and when the particular SCADA data point 416 includes video attribute 420, video master server 212 receives 628 a command from remote monitoring server 222. The command relates to a portion of the video data that is associated with a particular SCADA data point 416 within the numerical data. Database 226 determines 630 an identifier associated with the particular SCADA data point 416. More specifically, database 226 determines a timestamp of the particular SCADA data point 416. In one embodiment, remote monitoring server 222 automatically transmits the command in response to an alarm or event that is detected upon an analysis of the numerical data acquired by SCADA elements 206. More specifically, SCADA data exchange layer 304 issues the command to video remote client 230 (shown in FIG. 5), including the identifier associated with the particular SCADA data point 416. Video remote client 230 then transmits the command to video master server 212 via I/O communication layer 302.

In an alternative embodiment, a user inputs the command via user interface 224 (shown in FIG. 4) in response to a detection of an alarm or event within the numerical data, and remote monitoring server 222 transmits the command to video master server 212. More specifically, user interface 224 transmits the command to SCADA data exchange layer 304, including the identifier associated with the particular SCADA data point 416. SCADA data exchange layer 304 issues the command to video remote client 230, which then transmits the command to video master server 212 via I/O communication layer 302.

In another alternative embodiment, a user inputs the command via user interface 224 and remote monitoring server 222 transmits the command to video master server 212. More specifically, user interface 224 transmits the command, including the identifier associated with the particular SCADA data point 416, to SCADA data exchange layer 304. SCADA data exchange layer 304 issues the command to video remote client 230, which then transmits the command to video master server 212 via I/O communication layer 302.

In the exemplary embodiment, video master server 212 identifies 632 a portion of the video data that is associated with the identifier included in the command received from I/O communication layer 302. More specifically, video master server 212 identifies a portion of the video data that matches, for example, a timestamp provided by a particular video camera 158 that obtained the identified portion of the video data. Video master server 212 retrieves 634 the identified portion of the video data from a memory, and transmits 636 the identified portion of the video data to remote monitoring server 222. More specifically, video master server 212 transmits the identified portion of the video data to I/O communication layer 302, which provides the identified portion of the video data to video remote client 230, which in turn provides the identified portion of the video data to SCADA data exchange layer 304. The identified portion of the video data is then presented 638 to the user via user interface 224, along with the numerical data associated with the particular SCADA data point 416.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring a wind turbine using a combined supervisory command and data acquisition (SCADA) and video monitoring system, said method comprising:
   receiving video data at a video server from at least one video camera, the video data related to operating conditions of the wind turbine;
   receiving numerical data at a SCADA server from at least one SCADA element, the numerical data related to operating conditions of the wind turbine;
   receiving a command at the SCADA server from a remote monitoring server, the command relating to at least a portion of the numerical data, the portion of the numerical data associated with at least a portion of the video data
   receiving a command at the video server from the remote monitoring server, the command relating to the portion of the video data associated with the portion of the SCADA data;
   retrieving the portion of the video data and the portion of the numerical data; and,
   transmitting the portion of the numerical data and the portion of the video data from the SCADA server and the video server, respectively, via a first network and a second network, respectively, to the remote monitoring server for presentation to a user.

2. A method in accordance with claim 1, wherein receiving a command comprises one of receiving an automatic command from the remote monitoring server and receiving a user command from the remote monitoring server.

3. A method in accordance with claim 1, further comprising applying an identifier to the video data as the video data is received from the at least one video camera.

4. A method in accordance with claim 3, further comprising identifying the portion of the video data according to an identifier received from the remote monitoring server.

5. A method in accordance with claim 1, further comprising compressing the portion of the video data before transmitting the portion of the video data to the remote monitoring server.

6. A system for use in monitoring a wind farm having a plurality of wind turbines, said system comprising:
   at least one video camera configured to capture video data related to operating conditions of an associated wind turbine;
   at least one supervisory command and data acquisition (SCADA) element configured to capture numerical data related to the operating conditions of an associated wind turbine;
   a user interface; and,
   a plurality of servers comprising:
      at least one remote monitoring server;
      at least one video server communicatively coupled to said at least one video camera and said user interface, said at least one video server further communicatively coupled to said at least one remote monitoring server via a first network; and,
      at least one SCADA server communicatively coupled to said at least one SCADA element and said user interface, said at least one SCADA server further communicatively coupled to said remote monitoring server via a second network,
   wherein, said plurality of servers configured to:
      determine a specific portion of the video data based on a corresponding portion of the numerical data;
      receive the specific portion of the video data; and,
      present the specific portion of the video data to a user via said user interface.

7. A system in accordance with claim 6, wherein said at least one video camera is positioned within a nacelle of each wind turbine.

8. A system in accordance with claim 6, wherein said at least one video camera is positioned external to a nacelle of each wind turbine.

9. A system in accordance with claim 6, wherein said at least one SCADA server is configured to receive and store the numerical data from said at least one SCADA element.

10. A system in accordance with claim 6, wherein said at least one video server is configured to receive, compress, and store the video data from said at least one video camera.

11. A system in accordance with claim 6, wherein said at least one SCADA server is configured to transmit the numerical data to said at least one remote monitoring server via said first network and said at least one video server is configured to transmit the video data to said at least one remote monitoring server via said second network.

12. A system in accordance with claim 11, wherein the numerical data includes event data, and wherein said at least one video server is configured to:
  automatically determine a portion of the video data associated with the event data; and,
  transmit the portion of the video data to said at least one remote monitoring server.

13. A system in accordance with claim 11, wherein the numerical data includes event data, and wherein said at least one video server is configured to:
  receive a user command from said at least one remote monitoring server and input the user command into said at least one remote monitoring server via said user interface in response to the event data;
  determine a portion of the video data associated with the event data; and,
  transmit the portion of the video data to said at least one remote monitoring server.

14. A system in accordance with claim 11, wherein said at least one video server is configured to:
  receive a user command from said at least one remote monitoring server and input the user command into said at least one remote monitoring server via said user interface;
  determine a portion of the video data associated with the user command; and,
  transmit the portion of the video data to said at least one remote monitoring server.

* * * * *